United States Patent
Watkins

(10) Patent No.: US 7,581,239 B1
(45) Date of Patent: Aug. 25, 2009

(54) VIDEO ON DEMAND DVD SYSTEM

(75) Inventor: Daniel Watkins, Saratoga, CA (US)

(73) Assignee: LSI Corporation, Milpitas, CA (US)

(*) Notice: Subject to any disclaimer, the term of this patent is extended or adjusted under 35 U.S.C. 154(b) by 943 days.

(21) Appl. No.: 09/918,232

(22) Filed: Jul. 30, 2001

Related U.S. Application Data

(63) Continuation of application No. 09/353,216, filed on Jul. 14, 1999, now Pat. No. 6,341,375.

(51) Int. Cl.
*H04N 7/173* (2006.01)
*G06F 15/16* (2006.01)
*H04N 3/27* (2006.01)
*H04J 1/00* (2006.01)

(52) U.S. Cl. .............................. 725/82; 725/74; 725/94; 725/100

(58) Field of Classification Search .............. 725/78, 725/80, 82, 83, 94, 87–89, 132, 140, 152, 725/52, 74, 100
See application file for complete search history.

(56) References Cited

U.S. PATENT DOCUMENTS

| | | | |
|---|---|---|---|
| 4,920,432 A * | 4/1990 | Eggers et al. .................. 386/96 |
| 5,155,590 A * | 10/1992 | Beyers et al. ................ 725/107 |
| 5,243,651 A | 9/1993 | Parikh et al. |
| 5,257,106 A * | 10/1993 | Maruoka ..................... 348/731 |
| 5,371,532 A * | 12/1994 | Gelman et al. ................. 725/88 |
| 5,436,675 A * | 7/1995 | Hayashi et al. ................ 725/72 |
| 5,519,435 A | 5/1996 | Anderson |
| 5,521,631 A * | 5/1996 | Budow et al. .................. 725/78 |
| 5,625,864 A | 4/1997 | Budow et al. |
| 5,642,154 A * | 6/1997 | Krishnamurthy et al. .... 725/107 |
| 5,729,279 A * | 3/1998 | Fuller ........................... 725/74 |
| 5,751,336 A | 5/1998 | Aggarwal et al. |
| 5,790,753 A * | 8/1998 | Krishnamoorthy et al. .. 709/203 |
| 5,808,660 A | 9/1998 | Sekine et al. |
| 5,883,671 A | 3/1999 | Keng et al. |
| 5,898,456 A | 4/1999 | Wahl |
| 5,923,361 A | 7/1999 | Sutton, Jr. |
| 5,928,327 A | 7/1999 | Wang et al. |
| 5,931,908 A | 8/1999 | Gerba et al. |
| 5,935,206 A * | 8/1999 | Dixon et al. ................. 709/219 |
| 5,973,748 A | 10/1999 | Horiguchi et al. |
| 6,018,765 A | 1/2000 | Durana et al. |
| 6,049,823 A * | 4/2000 | Hwang ......................... 725/82 |
| 6,108,695 A * | 8/2000 | Chawla ....................... 709/217 |
| 6,137,537 A * | 10/2000 | Tsuji et al. .................. 348/554 |
| 6,195,797 B1 * | 2/2001 | Williams, Jr. ................. 725/74 |

(Continued)

*Primary Examiner*—Christopher Kelley
*Assistant Examiner*—Reuben M Brown
(74) *Attorney, Agent, or Firm*—Christopher P. Maiorana, PC

(57) ABSTRACT

An apparatus comprising a drive server, a control server and one or more decoder devices. The drive server may be configured to present one or more DVD data streams in response to one or more input signals. The control server may be configured to present one or more compressed data streams in response to the one or more data streams and one or more request signals. The decoders may be configured to present a decoded video signal and a decoded audio signal in response to one of the compressed data streams and the request signals. The navigation software, which traditionally is processed local to the decoder, may be processed on the control server. The control server may be enabled to control the remote decoder.

19 Claims, 5 Drawing Sheets

U.S. PATENT DOCUMENTS

| | | | |
|---|---|---|---|
| 6,353,460 B1 * | 3/2002 | Sokawa et al. | 348/555 |
| 6,381,747 B1 * | 4/2002 | Wonfor et al. | 725/104 |
| 6,473,902 B1 * | 10/2002 | Noritomi | 725/91 |
| 6,532,269 B2 * | 3/2003 | Yamada et al. | 375/265 |
| 6,556,546 B1 * | 4/2003 | Maeda et al. | 370/282 |
| 6,631,403 B1 * | 10/2003 | Deutsch et al. | 709/217 |
| 6,684,401 B1 * | 1/2004 | Zou | 725/80 |
| 7,000,243 B1 * | 2/2006 | Fenwick et al. | 725/74 |
| 2005/0028208 A1 * | 2/2005 | Ellis et al. | 725/58 |

* cited by examiner

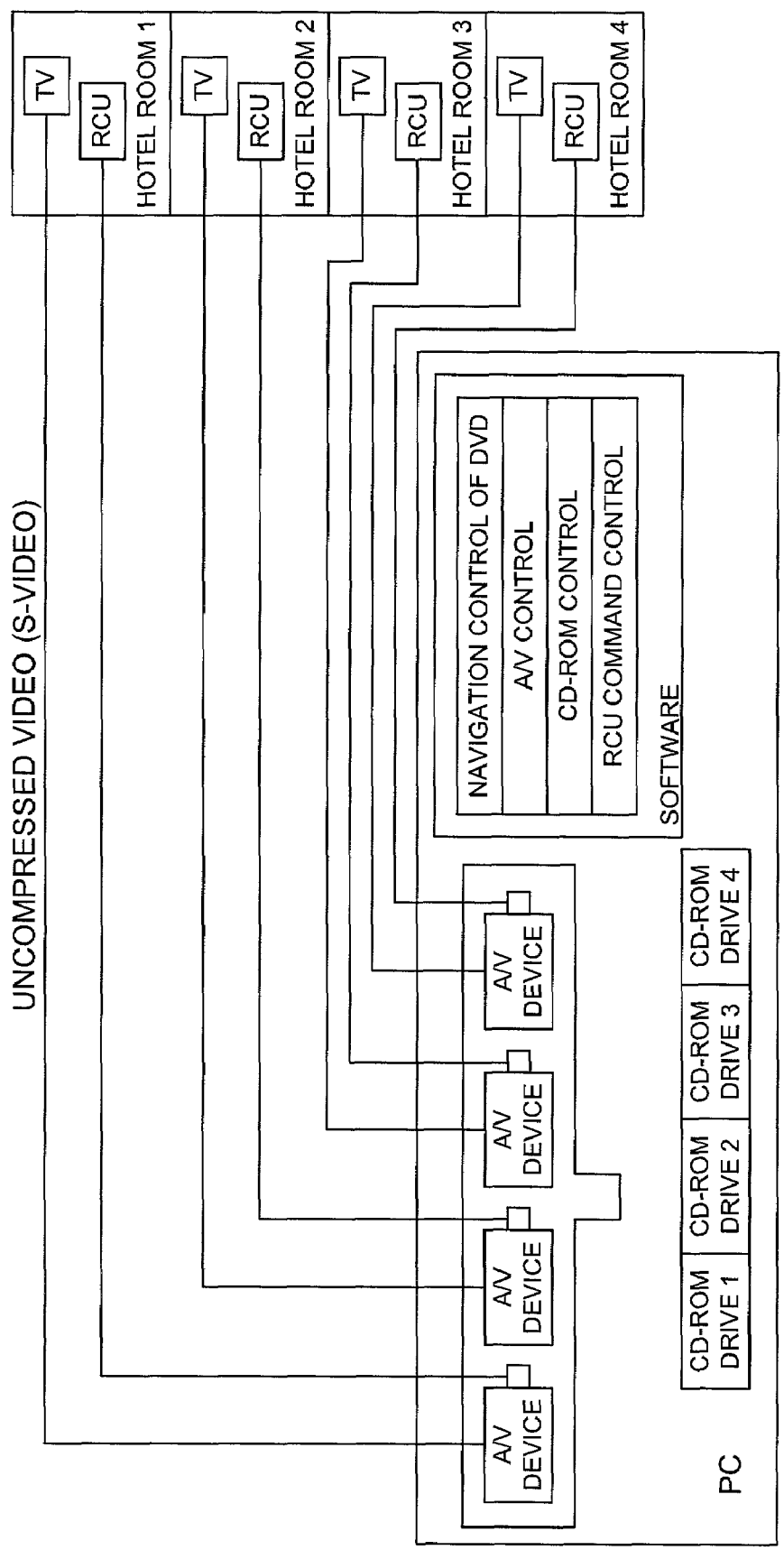
FIG. 1
(CONVENTIONAL)

VIDEO ON DEMAND DVD SYSTEM

This is a continuation of U.S. Ser. No. 09/353,216 filed Jul. 14, 1999, now U.S. Pat. No. 6,341,375.

FIELD OF THE INVENTION

The present invention relates to video on demand systems generally and, more particularly, to a video on demand DVD system.

BACKGROUND OF THE INVENTION

Conventional digital video disk (DVD) players are implemented as stand-alone systems. In a multi-user environment, such as a hotel (or apartment) complex, a separate DVD player would have to be implemented in each room.

Conventional video on demand (VOD) systems provide a centralized storage location that may present independent video and audio programming to a number of rooms. Such a conventional video on demand system is shown in FIG. 1. Since conventional video on demand systems use S-video cables between the decoders and the monitors, the distance between the remote locations and the decoders can be hundreds of feet. However, with a DVD player, extensive decoding is included within the DVD players that prohibits use in a video on demand system. Additionally, personal computers (PCs) may implement DVD drives, but suffer from the same limitations of stand-alone players. Specifically, an individual PC would have to be dedicated to each room in the multi-user environment.

Video on demand systems used for MPEG1 VCD or MPEG2 titles are typically implemented as personal computers with peripheral connect interface (PCI) add-on cards that support four or more video decoders. The decoders are implemented centrally at the PC level. Such centralized systems are used with hotel video on demand systems. A drive running a title and a decoder are dedicated to each hotel room. The uncompressed video from the dedicated video compact disc (VCD) is wired to the room with, for example, S-Video cable. A separate cable allowing a remote control to control user options (e.g., stop, fast forward, rewind, etc.) is used as a feedback back to the player in the central location.

DVD titles use Macrovision copyright security as a required component encoded on each DVD player. When VOD systems are upgraded to support DVD, for applications where Macrovision copyright security on uncompressed video is not adequate, the infrastructure needs to be upgraded to a support compressed video feed to a decoder that resides in the room, but before the television. Macrovision application license restrictions include limiting the length of cable. It would be desirable to implement a DVD video on demand system without the requirement (and associated cost) of implementing a DVD Player for each remote location.

SUMMARY OF THE INVENTION

The present invention concerns an apparatus comprising a drive server, a control server and one or more decoder devices. The drive server may be configured to present one or more data streams in response to one or more input signals. The control server may be configured to present one or more compressed data streams in response to the one or more data streams and one or more request signals. The decoders may be configured to present a decoded video signal and a decoded audio signal in response to one of the compressed data streams and the request signals.

The objects, features and advantages of the present invention include providing a video on demand DVD system that may (i) be enabled to have navigation software local to host server, while a remote source decoder is in another room, (ii) be enabled to control a remote source decoder directly, (iii) implement navigation software on a host server and/or (iv) implement a number of shared DVD drivers at a centralized location.

BRIEF DESCRIPTION OF THE DRAWINGS

These and other objects, features and advantages of the present invention will be apparent from the following detailed description and the appended claims and drawings in which:

FIG. 1 is a diagram of a conventional video on demand system;

DETAILED DESCRIPTION OF THE PREFERRED EMBODIMENTS

Figure 2:
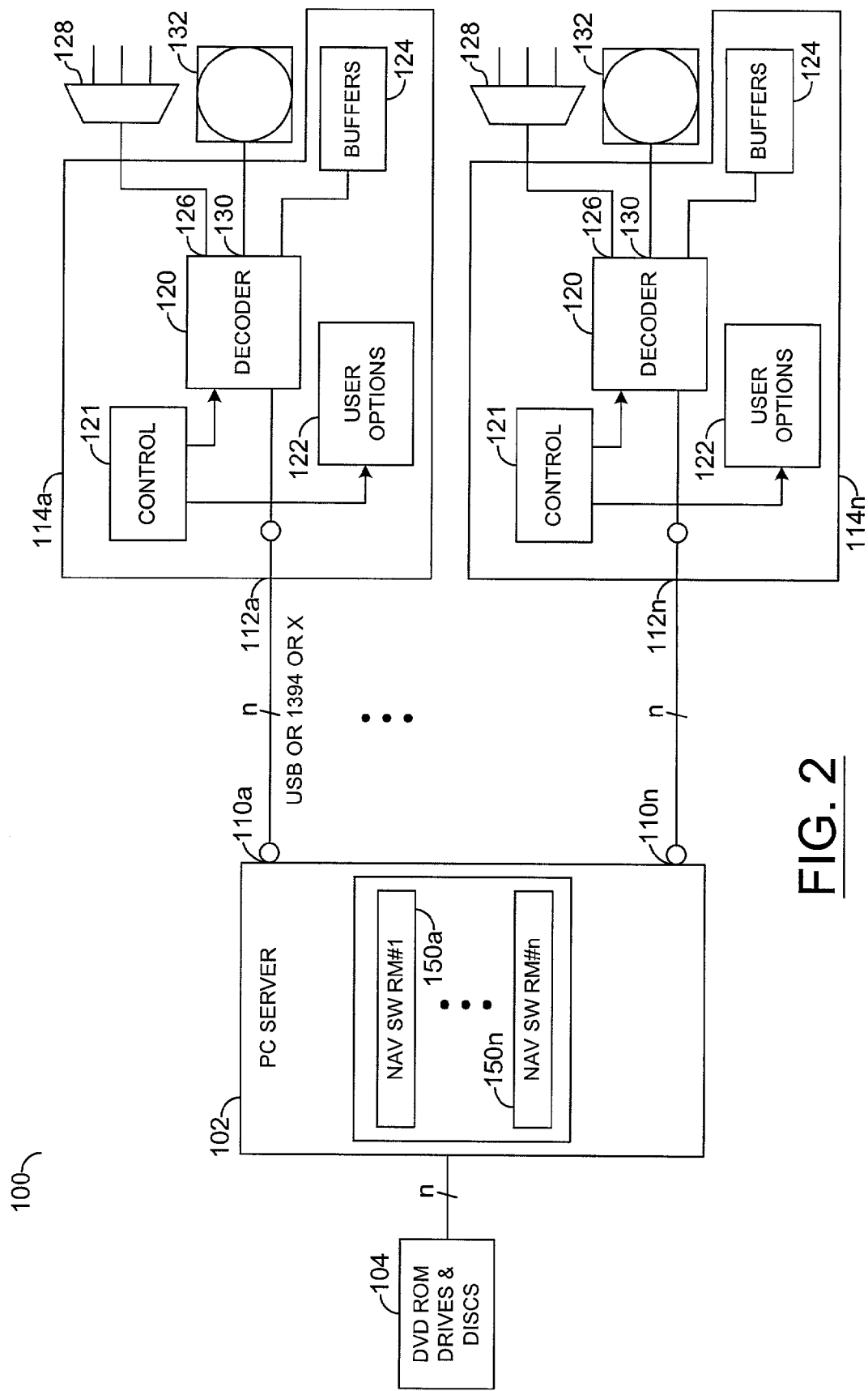
FIG. 2 is a diagram of a preferred embodiment of the present invention.

Referring to FIG. 2, a block diagram of a DVD video on demand system 100 is shown in accordance with a preferred embodiment of the present invention. The video on demand system 100 generally comprises a server 102 and a disk library 104. The disk library 104 generally comprises one or more DVD drives and associated disks that present one or more signals to the server 102. The server 102 may be implemented as a personal computer or other appropriate server.

The server 102 may present a number of compressed bitstreams (e.g., DVD bitstreams) at a number of outputs 110a-110n that may be received at a number of inputs 112a-112n. The inputs 112a-112n are generally located in a number of individual remote decoders 114a-114n, that may be located, in one example, in a set-top box. In another example, the remote decoders 114a-114n may be built into the tuner section of a television. In either implementation, the remote decoders 114a-114n may be located in one or more remote locations, such as rooms in a hotel or apartment. The remote decoders 114a-114n may be implemented, in another example, as a component of a multifunction decoding device (to be described in more detail in connection with FIG. 3).

Each of the remote decoders 114a-114n generally comprise a decoder portion (or circuit) 120, a control portion (or circuit) 121, a user options input interface 122, and one or more buffers 124. The control circuit 121 may be implemented as a host processor or state machine control device. The decoder 120 may present a decoded audio signal at an output 126 that is generally presented to one or more speakers 128. The decoder 120 may also present a decoded video signal at an output 130 that may be presented to a video display 132 (e.g., a television screen or a computer monitor). The decoded audio signal may be a monophonic channel, a dolby digital two channel signal, a dolby digital 5.1 channel signal, a DTS 5.1 channel signal, or other appropriate single or multi-channel audio signal. In general, the audio signals presented at the output 126 are line level signals that may be presented to an audio amplifier (not shown) to power one or more speakers. The amplifier may be built into the display 132 or may be implemented as a separate multi-channel amplifier.

To upgrade a video on demand infrastructure, the decoder 120 is generally physically located within a few feet of the display device 132. The compressed DVD bitstreams are generally feed to the remote decoders 114a-114n from the server 102. The decoder 120 decodes the video and audio portions of compressed DVD bitstream. The navigation software (i.e., the software that controls functions such as fast forward, rewind, pause, etc.) may be implemented locally to the decoder 120, similar to conventional DVD players. Alternately, since the video signals are generally received from a centralized server, the server 102 may be implemented to run all the navigation software. The navigation software may interpret user options (e.g., request signals) received from a user remote control (not shown). The request signals from the user remote control may be received from a separate cable that feeds back to the server 102. The circuit 100 illustrates n cables connected between each of the outputs 110a-110n and each of the inputs 112a-112n. Since such a cable system may already be in place, the only upgrade necessary may be the remote decoder 114 in the room, the navigation software running on the server, and the DVD drive server.

In one example, the decoder 120 may be implemented as a dedicated optimized hardware audio and video decoder. Additionally, the user options circuit 122 and the buffers circuit 124 may also be implemented on a single chip along with the decoder 120. However, separate chip solutions may also be implemented to meet the design criteria of a particular implementation.

A cost savings may result by having the navigation software for all the decoders 120 in each of the remote decoders 114a-114n run on the server 102. The user may be given a DVD control template to select a particular option. Since most of the processing may be done by the server 102, the remaining needs for the remote decoders 114a-114n may be limited. For example, the remote decoders 114a-114n may need to receive the uncompressed video, via Universal Serial Bus (USB), 1394 bus or other appropriate interface/bus configuration. A feedback of the user options may be implemented, in one example, using the same control system previously used for VCD. Centralizing the navigation controls may greatly reduce memory and processor performance requirements for the remote decoders 114a-114n, further reducing cost.

For the connections between the outputs 110a-110n and the inputs 112a-112n, USB or 1394 may be needed, since DVD bitstreams have 2 to 10 Mbps data rate. One of a number of decoder navigation modules 150a-150n running on the server 102 may be dedicated to each remote decoder 114a-114n. The control of the source decoder may be received from the buffers 124. One or more simple state machines may control the read and write operations sent to the decoder 120 in each of the remote decoders 114a-114n. The decoder 120 may include host registers as well as buffer interrupts (not shown). The control of the decoders 120a-120n may be embedded in the communication media and may be a different structure from the DVD bitstream, as in the case of USB or 1394.

The present invention may provide navigation software traditionally local to the DVD player or DVD PC at the server 102 of a VOD system, enabling low cost decoder boxes at destination televisions. The navigation software on the server 102 may parse the DVD bitstream and may process user options such that the remote decoders 114a-114n may be remotely controlled. The communication media between the server 102 and the remote decoders 114a-114n may support the DVD bitstream as well as the programming of the decoder 120. Appropriate navigation software coding can readily be prepared by skilled programmers based on the teachings of the present disclosure, as will also be apparent to those skilled in the relevant art(s).

The present invention may enable a cost effective solution to DVD VOD systems. For example, if a DVD Player costs $500, and the per location solution of the present invention is $150 per location, a significant cost savings to implement DVD in each location may result. The present invention proposes bulk drives on capable servers, with a minimal cost in the remote decoders 114a-114n.

Figure 3:
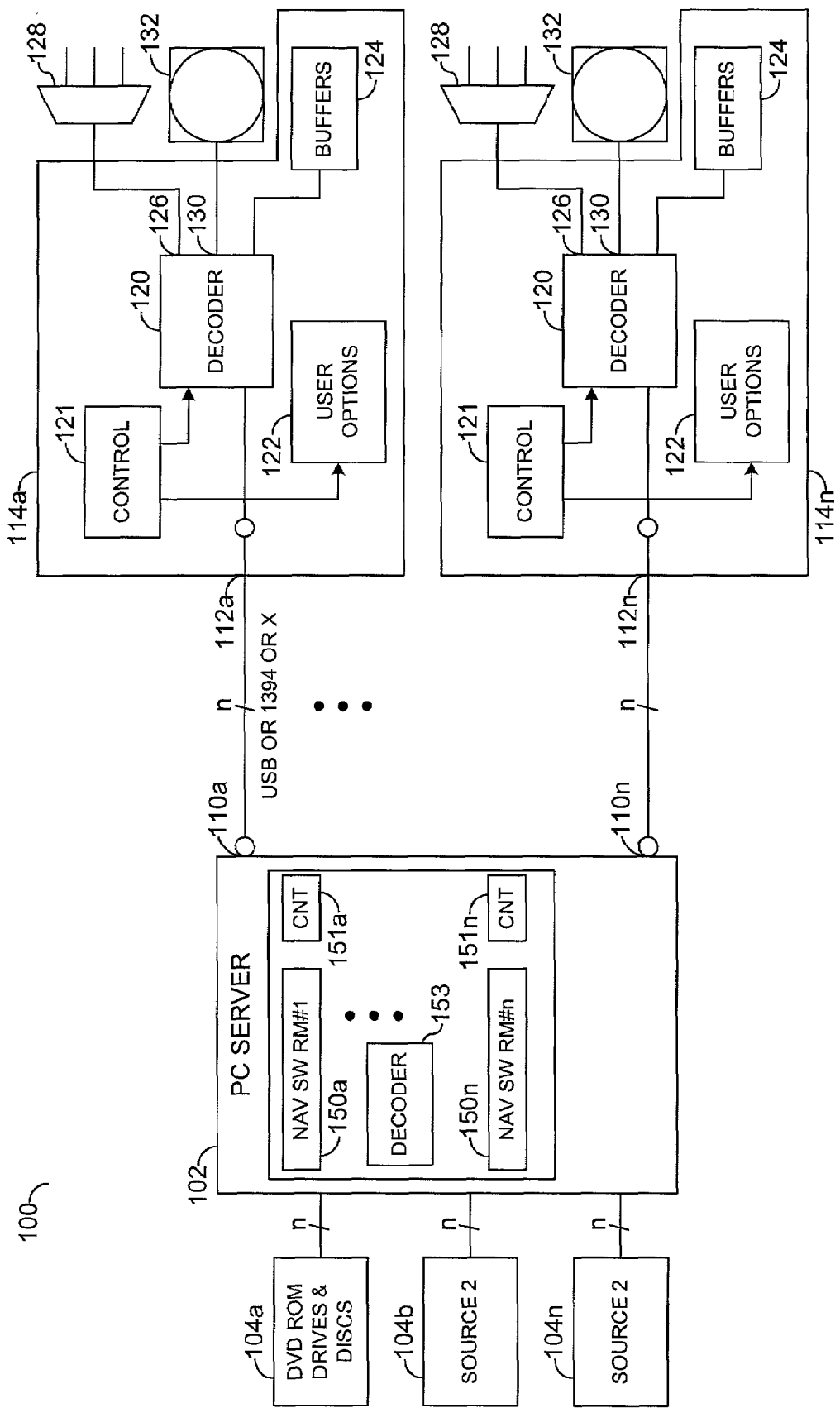
FIG. 3 is a diagram of an alternate embodiment of the present invention.

Referring to FIG. 3, an alternate embodiment of the present invention is shown. A number of source devices 104a-104n are shown presented to the server 102. One of the source devices (e.g., 104a) may be a DVD ROM server as shown in FIG. 1. However, an additional number of source devices 104b-104n may be implemented. For example, a source for digital television (DTV) may be implemented as the source 104b, a source for a satellite may be implemented as the source 104c and a source for cable TV may be implemented as one of the sources 104a-104n. The server 102 may be implemented to select between one of the sources 104a-104n to present data to a particular one of the outputs 110a-110n. The remote decoders 114a-114n may be modified to decode the various sources 104a-104n. In such an implementation, the present invention may enable a number of remote decoders 114a-114n to support a full spectrum of video and audio formats found in the various evolving multiple broadcast standards. Furthermore, with personal computers providing a number of multimedia functions as well as audio components providing a number of multimedia functions, convergence of various formats can be supported by the remote decoders 114a-114n. For example, a MPEG-2 bitstream may be presented at the outputs 110a-110n.

Additionally, the example illustrated in FIG. 3 may provide a number of decoder control circuits 151a-151n. The decoder control circuits 151a-151n may be optional circuits that may be used to control the particular navigation software elements 150a-150n. Additionally, a decoder 153 may be implemented that may control each of the navigation software elements 150a-150n.

Figure 4:
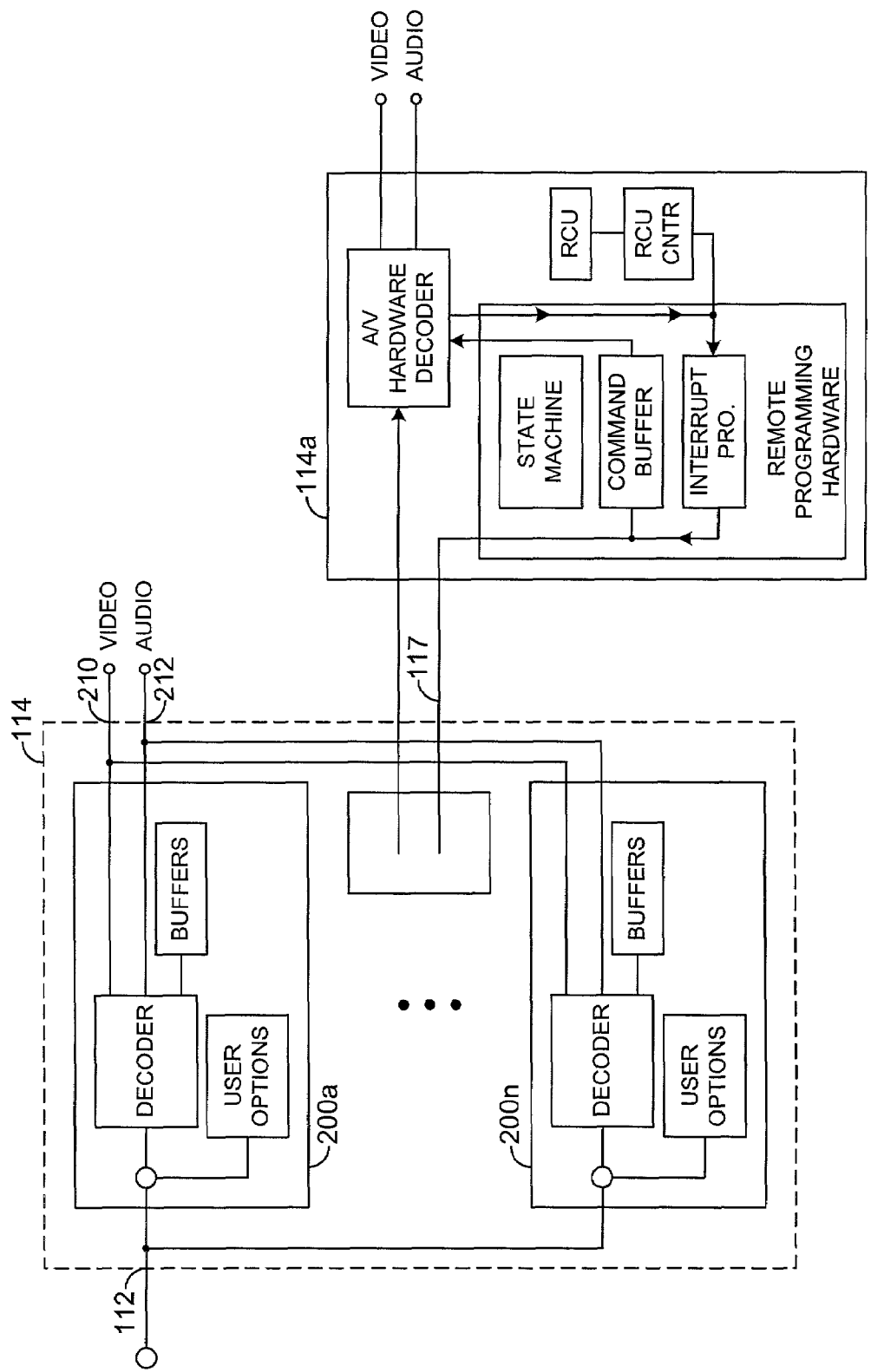
FIG. 4 is a diagram of an alternate implementation of the decoder of FIG. 3.

Referring to FIG. 4, an example of a multifunction remote decoder 114 is shown. The remote decoder 114 generally has an input 112 that may receive one of the number of sources 110a-110n. A number of individual decoding elements 200a-200n may be provided to decode the particular source. The signal received at the input 112 may be presented to inputs of the various decoding elements 200a-200n. The outputs of the decoder elements 200a-200n may be presented to an output 210 and an output 212. A multiplexer (not shown) may be implemented to switch between the various outputs of the individual decoder elements 200a-200n. In one example, the decoder elements 200a-200n may be implemented as a single integrated circuit. However, to provide flexibility for future standards, the individual decoder elements 200a-200n may be implemented as one or more integrated circuits. For example, if the remote decoder 114 is implemented to decode three current video/audio standards, a single chip implementing three individual decoders 200a-200n may be used. However, to implement a fourth standard, a second integrated circuit 114a may be implemented as a new decoder and may be configured to add to the existing decoders. In one example, the decoder 114a may be connected to the decoder 114 through a universal serial bus or other appropriate interconnection 117.

Remote programming of the decoder, independent of the local host processor may be done for diagnostic purposes, or to reduce cost on components. In one example, the USB or 1394 process may enable remote programming of the decoder and user options presented to server.

Figure 5:
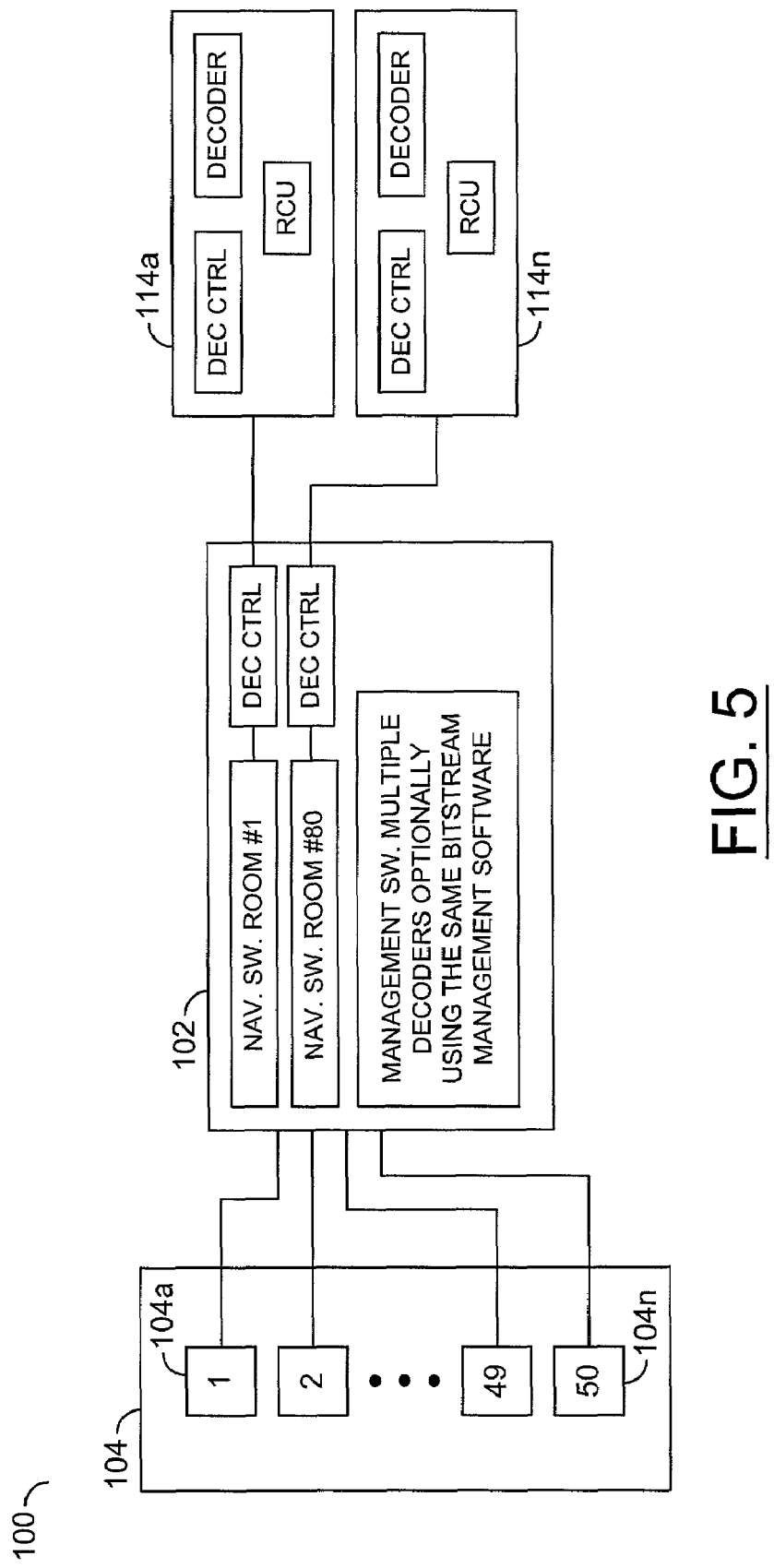
FIG. 5 is another alternate embodiment of the present invention.

Referring to FIG. 5, an alternate implementation of the circuit 100 is shown. A number of source devices 104a-104n are shown presenting a number of input signals to the server 102. Each of the devices 104a-104n may be configured to continuously play a number of source titles. A number of decoders may select any of the source devices 104a-104n at a particular time. The selection is generally within the constraints of the selected source 104a-104n. Particularly, the bandwidth capabilities for handling multiple navigating of a particular source 104a-104n must generally be met. If enough titles are implemented in enough sources 104a-104n, the remote decoders 114a-114n may be able to select a particular title at a particular time. In order to solve the mentioned bandwidth capability issues, the same titles may be started at offset times, which may present the appearance of an unlimited selection of titles. In addition, a single bitstream may be sent to each of the decoders 114a-114n to initiate a diagnostics test.

When sending a single bitstream to a number of decoders 114a-114n, a bandwidth of 20 Mb/sec can be implemented in certain DVD drives. In such an example, up to four decoders may be supported. For example, if a DVD drive can present a 9.8 Mb/sec bit rate, and the compressed bitstream is typically 4 Mb/sec, four decoders 114a-114n may be supported.

While the invention has been particularly shown and described with reference to the preferred embodiments thereof, it will be understood by those skilled in the art that various changes in form and details may be made without departing from the spirit and scope of the invention.

The invention claimed is:

1. An apparatus comprising:
a drive server configured to present one or more compressed data streams;
a control server separate from said drive server and configured to present a particular one of said one or more compressed data streams received from said drive server on a particular one of one or more busses as determined by a particular one of a plurality of request signals;
one or more remote devices connected to said busses, at least one of said remote devices being disposed in a separate room from said control server and said drive server, each of said remote devices comprising a first decoder circuit and a control circuit, said first decoder circuit being configured to decode and decompress at least one of said one or more compressed data streams received from said control server to generate at least one of a decoded video signal and a decoded audio signal;
one or more navigation software modules executable on said control server, each of said navigation software modules being configured to (i) generate one or more control signals that program a respective one of said first decoder circuits in response to one or more user options entered at said respective remote device and (ii) parse a respective one of said one or more compressed data streams; and
a supplemental decoder coupled to at least one of said remote devices through a serial interface to receive at least an additional one of said compressed data streams through said serial interface, said supplemental decoder decoding and decompressing said additional compressed data stream, said supplemental decoder comprising (i) an additional decoder circuit and (ii) a state machine configured to control a plurality of read operations and a plurality of write operations sent to said additional decoder circuit.

2. The apparatus according to claim 1, wherein said one or more user options are remotely controlled by a user.

3. The apparatus according to claim 1, wherein said one or more remote devices are configured to enter a diagnostic mode in response to receiving a particular one of said one or more control signals from said control server.

4. The apparatus according to claim 1, wherein said one or more compressed data streams comprise one or more DVD bitstreams.

5. The apparatus according to claim 1, wherein a particular one of said compressed data streams is presented to two or more of said remote devices at a particular time.

6. The apparatus according to claim 1, wherein said plurality of busses comprises at least two of (i) one or more universal serial busses and (ii) one or more 1394 busses.

7. The apparatus according to claim 1, wherein said one or more user options comprise a fast forward request.

8. The apparatus according to claim 1, wherein at least one of said remote devices further comprises a second decoder circuit capable of decoding and decompressing in accordance with a second compression standard different than a first compression standard of said first decoder circuit.

9. The apparatus according to claim 8, wherein said supplemental decoder decoding and decompressing is in accordance with a third compression standard different than said first compression standard and said second compression standard.

10. An apparatus comprising:
a drive server configured to present a plurality of DVD bitstreams;
a control server separate from said driver server and configured to present said DVD bitstreams received from said drive server on a plurality of cables in response to a plurality of first remotely generated request signals;
a plurality of remote devices connected to said cables, at least one of said remote devices being disposed in a separate room from said control server and said driver server, each of said remote devices comprising a first decoder circuit and a control circuit, said first decoder circuit being configured to decode and decompress at least one of said DVD bitstreams received from said control server to generate at least one of a decoded video signal and a decoded audio signal;
a plurality of navigation software modules each executable on said control server, each of said navigation software modules being configured to generate one or more control signals that program a respective one of said first decoder circuits in response to one or more user options entered at said respective remote device;
a plurality of decoder control circuits within said control server, each of said decoder control circuits being configured to control a respective one of said navigation software modules for programming of a respective one of said first decoder circuits within said remote devices; and
a supplemental decoder coupled to at least one of said remote devices through a serial interface to receive at least an additional one of said DVD bitstreams through said serial interface, said supplemental decoder decoding and decompressing said additional DVD bitstream, said supplemental decoder comprising (i) an additional decoder circuit and (ii) a state machine configured to control a plurality of read operations and a plurality of write operations sent to said additional decoder circuit.

11. The apparatus according to claim 10, wherein said first decoder circuits are configured to generate said at least one of said decoded video signal and said decoded audio signal in response to said one or more control signals.

12. The apparatus according to claim 10, wherein each of said cables comprise a serial bus.

13. The apparatus according to claim 10, further comprising:
   parsing said DVD bitstreams with said navigation software modules.

14. The apparatus according to claim 10, wherein at least one of said remote devices further comprises a second decoder circuit capable of decoding and decompressing in accordance with a second compression standard different than a first compression standard of said first decoder circuit.

15. A method for distributing video, comprising the steps of:
   (A) presenting one or more compressed data streams with a drive server to a control server separate from said drive server;
   (B) distributing said one or more compressed data streams from said control server to one or more remote devices across one or more busses in response to one or more request signals;
   (C) decoding and decompressing at least one of said one or more compressed data streams with one or more first decoder circuits within said one or more remote devices;
   (D) presenting at least one signal selected from a decoded video signal and a decoded audio signal in response to decoding said at least one of said one or more compressed data streams, wherein at least one of said one or more remote devices is disposed in a separate room from said control server and said driver server;
   (E) executing one or more navigation software modules on said control server, each of said navigation software modules being configured to (i) generate one or more control signals that program a respective one of said first decoder circuits in response to one or more user options entered at said respective remote device and (ii) parse a respective one of said one or more compressed data streams;
   (F) distributing at least an additional one of said compressed data streams from at least one of said remote device through a serial interface to a supplemental decoder, said supplemental decoder decoding and decompressing said additional compressed data stream, said supplemental decoder comprising an additional decoder circuit and a state machine; and
   (G) controlling with said state machine a plurality of read operations and a plurality of write operations sent to said additional decoder circuit.

16. The method according to claim 15, wherein said plurality of busses comprise at least two of (i) one or more universal serial busses or (ii) one or more 1394 busses.

17. The method according to claim 15, wherein said one or more compressed data streams comprise one or more DVD bitstreams.

18. The method according to claim 15, wherein said one or more user options comprise a fast forward request.

19. The method according to claim 15, wherein step (C) comprises the sub-step of:
   decoding and decompressing said at least one of said one or more compressed data streams in a second decoder circuit in at least one of said remote devices, wherein said second decoder circuit is configured to decode and decompress in accordance with a second compression standard different than a first compression standard of said first decoder circuits.

* * * * *